United States Patent [19]

Betts

[11] 4,229,814
[45] Oct. 21, 1980

[54] MULTIPLEX CONFERENCE BRIDGE

[75] Inventor: William L Betts, Madeira Beach, Fla.

[73] Assignee: E-Systems, Inc., Dallas, Tex.

[21] Appl. No.: 926,635

[22] Filed: Jul. 21, 1978

[51] Int. Cl.³ .................... H04M 3/56; H04Q 11/04
[52] U.S. Cl. .................................................. 370/62
[58] Field of Search .......... 179/18 BC, 1 CN, 15 AL

[56] References Cited

U.S. PATENT DOCUMENTS

| | | | |
|---|---|---|---|
| 3,883,697 | 5/1975 | Brown | 179/18 BC |
| 3,937,898 | 2/1976 | Presto et al. | 179/18 BC |
| 3,984,643 | 10/1976 | Inrig et al. | 179/18 BC |
| 4,000,377 | 12/1976 | Sharret | 179/18 BC |
| 4,059,735 | 11/1977 | Betts | 179/18 BC |
| 4,109,111 | 8/1978 | Cook | 179/18 BC |

FOREIGN PATENT DOCUMENTS 1409610  10/1975  United Kingdom ............... 179/18 BC

*Primary Examiner*—Thomas W. Brown
*Attorney, Agent, or Firm*—Albert M. Crowder, Jr.; Robert V. Wilder

[57] ABSTRACT

A conferencing circuit for use in a digitized speech, time division multiplex (TDM) loop communication system. Digitized speech samples from subscriber stations are extracted from the TDM loop and summed over a frame interval. The sum is stored and the input from each subscriber station is subtracted from the sum and the remainder is placed on the TDM loop for return to the respective subscriber station. A conference control signal is generated which is synchronous with the TDM loop and the subscriber stations' time slot and has a given state during each time slot assigned to a subscriber station that participates in the conference. The conference control signal controls the circuitry which sums the digitized speech samples generated by the conference subscriber stations.

9 Claims, 1 Drawing Figure

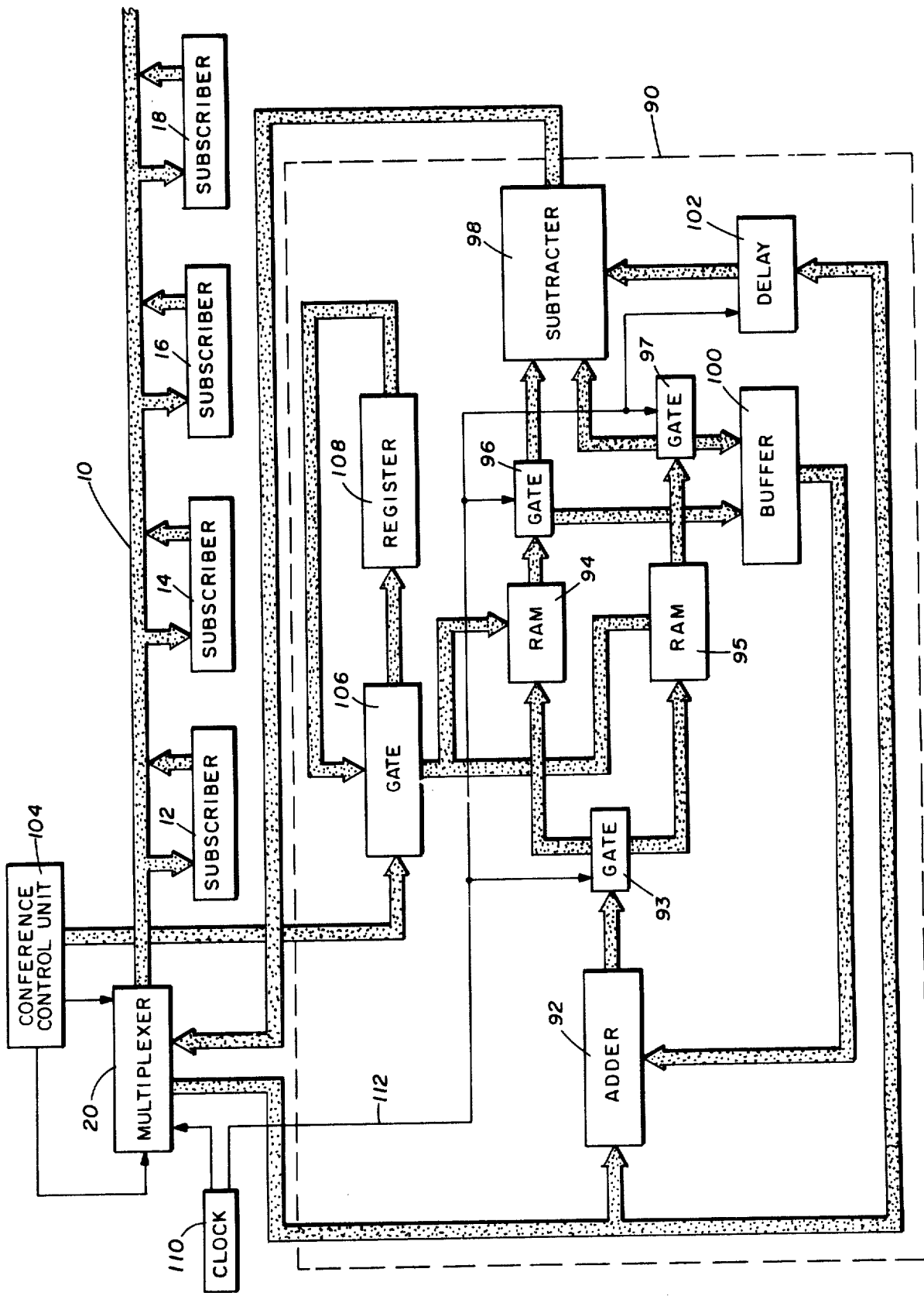

MULTIPLEX CONFERENCE BRIDGE

A related invention entitled Multiplex Conference Bridge is disclosed in copending application Ser. No. 937,444 filed Aug. 28, 1978.

BACKGROUND OF THE INVENTION

The present invention relates to digitized speech communications systems and more particularly to a conferencing circuit for use in a time division multiplex loop communications system.

In a digitized speech, time division multiplex communications system, all of the subscriber stations are connected on a common communications path which is allocated to each subscriber station on a time division basis. Analog speech signals are sampled at a constant rate and each sample is converted into an equivalent digital word. During designated time slots each subscriber station removes from the loop the digitized speech sample sent to that subscriber station while during another time slot there is placed on the loop the output speech sample from the subscriber station. The speech samples are provided to each subscriber station and returned from each subscriber station at such a rate as to make possible continuous communication between the subscriber stations despite the sharing of the communications path.

A conferencing circuit in a communications system enables a plurality of subscribers to engage in a group conversation. Numerous circuits of this type have been developed, both for analog and digital applications. With the development of digitized speech communications using time division multiplexing, a need has arisen for a digital conferencing circuit which can group any number of subscriber stations, does not interfere with non-conference communications, and effectively suppresses side-tone interference.

A prior art digital conferencing circuit is shown in U.S. Pat. No. 3,551,600 to Berch. In this circuit, a number of telephone lines are scanned, the voltage digitized and the resulting digital words summed for all the lines. The signal returned to each subscriber station has that particular station's input removed through algebraic subtraction. Although this circuit does provide side-tone suppression, it does not include means for passing through non-conference conversations and does not provide for a digital selection of conferees.

SUMMARY OF THE INVENTION

In accordance with the present invention, there is provided a conferencing circuit for use with a time-division multiplex loop communications system in which each subscriber station is assigned a time slot within a repeating time frame and each time slot has a digital speech input sample and output sample. The conferencing circuit includes repeating, binary, conferee selector signal which is synchronous with the time division multiplex loop and has a given state in sequence with a subscriber station time slot to include that particular subscriber station within the conference call. A summation circuit is provided for generating a summation sample of all subscriber station outputs generated during each frame and the sum thus produced is stored at the end of the time frame. During the following time frame, the stored sample is sent to each subscriber station in the conference minus that station's input previously used in producing the summation sample.

BRIEF DESCRIPTION OF THE DRAWINGS

For a more complete understanding of the present invention and the advantages thereof, reference is now made to the following description taken in conjunction with the accompanying drawing in which The FIGURE is a block diagram of a conferencing circuit in accordance with the present invention.

DETAILED DESCRIPTION OF THE INVENTION

A time division multiplex communication loop and a conferencing circuit in accordance with the present invention are illustrated in block diagram form in the FIGURE. A time division multiplex (TDM) loop 10 is the common pathway for interconnecting subscriber stations 12, 14, 16, and 18. It is possible to have many additional subscriber stations on the TDM loop 10 with the primary limitation on the number of stations being the data rate of the loop. In this invention each digital speech sample is a 12 bit word with the 12 bits being shifted in parallel fashion over the loop.

A multiplexer 20 reads the output words from each of the subscriber stations and provides the input words to each of the subscriber stations. Multiplexer 20 routes speech samples to and from the subscriber stations. The multiplexer 20 comprises a plurality of pairs of transmit and receive multiplexer integrated circuits. The transmit circuit is a Texas Instruments model 54154 and the receive circuit is a Texas Instruments model 54150. The number of circuit pairs required is a function of the number of subscribers and the number of bits comprising the digitized speech samples.

The elements comprising the multiplex conference bridge of the present invention are shown within the dotted outline 90. The time-division multiplex samples from each of the subscriber stations are supplied to a first input to an adder 92 which transfers voice samples alternately by frame through a gate 93 to a first random access memory (RAM) 94 and a second random access memory 95. The RAMS 94 and 95 transfer stored voice samples through gates 96 and 97 respectively to a subtracter 98 which provides a series of speech samples to the multiplexer 20 for transfer to the individual subscribers. The output of each RAM is also provided through the gates 96 and 97 to a buffer 100 that transfers a speech sample to a second input to the adder 92. The speech samples from the multiplexer 20 are also provided to a delay 102 which transfers the words to a second input to the subtracter 98.

A conference control unit 104 monitors status words generated by each of the subscriber stations. Each of the status words includes a conference selection code generated by the subscriber station to indicate that the station is requesting the establishment of a conference call. Based on the requests from the subscriber stations, the conference control unit 104 generates a series of random access memory address locations in synchronism with the TDM time slots which are passed through a gate 106 to a register 108. A conference control signal is also generated by the conference control unit 104 and provided to the multiplexer 20 to indicate which of the subscriber stations are engaged in conferences. Conference control unit 104 comprises a microprocessor model 8080 manufactured by Intel Corp.

In operation, the multiplex conferencing circuit uses 12-bit wide PCM encoded digitized speech samples that are derived from a multiplexer 20 which is connected to the TDM loop 10.

A clock 110 generates timing signals which are carried over line 112 to the multiplexer 20, gates 93, 96, and 97 and to the delay register 102.

The conference control unit 104 generates a memory address location for each conference which is requested by the subscriber stations. In this invention there may exist a plurality of conferences in progress at the same time. The conference memory addresses are passed to a gate 106 which transfers them into a register 108. In routine operation, the memory addresses are circulated from the register 108 through the gate 106 and back to the input of the register 108. This is done in synchronism with the TDM loop.

The random access memory addresses circulating in the register 108 are provided to both the RAMS 94 and 95. Thus, the same memory addresses are provided to both of the RAMS. When a change in the conferencing structure is noted by the conference control unit 104, a new memory address is generated or an existing address is deleted and this information is transferred to the gate 106. Upon receipt of the new information, the gate 106 provides the new memory address to both the register 108 and to the RAMS 94 and 95. The new memory address applied to the register 108 is included with the existing addresses and established in circulation through the register 108 and gate 106. Thus the conference control unit 104 generates new memory addresses or deletes old memory addresses only when there is a change in the conference structure.

The parallel PCM signals from the TDM loop 10 are provided to the adder 92 which adds them to a second input provided by the buffer 100. The resulting sum is passed on to either the RAM 94 or RAM 95 through the gate 93. The gate 93 alternates the connection of the adder 92 to the RAMS on a frame by frame basis. During a first frame the summation outputs from the adder 92 are stored in memory locations in the first RAM 94 with the memory locations being those circulating through register 108 and routed through gate 106 to the RAM 94. One memory location will be established for each conference in progress. For each memory location, and therefore for each conference, the sum stored at that location is read out and routed through gate 96 to the buffer 100 which provides the second input to the adder 92. This sum is added to the incoming sample to form a cumulative summation of the digitized words generated by each of the subscriber stations. Thus, at the end of the first frame, each conference memory location will have stored therein the sum of the digitized words generated by the subscribers in the conference associated with that location.

At the completion of the first frame the gate 96 transfers the output of the RAM 94 from the buffer 100 to the subtracter 98. The circulating memory addresses are again provided during the second frame to the RAM 94 but the gate 93 has switched the output of adder 92 from RAM 94 to RAM 95 therefore no new digitized speech samples are provided to the RAM 94 during the second frame, therefore, no changes are made in the words stored in the RAM 94. But the address words supplied to the RAm 94 from the gate 106 generate outputs which are provided to the subtracter 98 through the gate 96.

The digitized speech samples which were input during the first frame are delayed one frame period by the delay 102 and these words are supplied sequentially to the subtracter 98. The conference summation words are read out of the RAM 94 in sequence with the time slot assigned to the subscribers station engaged in the particular conference. The output signals from each of the subscriber stations are subtracted from the summation for that conference and the difference is transferred to the multiplexer 20 and passed on to the appropriate subscriber station. A control signal generated by the conference control unit 104 disables the multiplexer 20 from reading the output of the subtracter 98 for each time slot that is not assigned to a subscriber station involved in a conference. Therefore, only those subscriber stations engaged in conferences receive conference summation signals.

During the second frame period the adder 92 is connected by means of the gate 93 to the RAM 95 and the summation process for each conference as described above is repeated. At the end of the second frame, the gate 93 reconnects the adder 92 to the RAM 94, the gate 96 connects the RAM 94 to the buffer 100 and the gate 97 connects the output of RAM 95 to the subtracter 98. Thus, for the third frame the process that was described above for the first frame is repeated.

The random access memories 94 and 96 are implemented as Fairchild Integrated Circuits Model 93419. Gates 93, 96, 97 and 106 are model 75155 and 74157 integrated circuits manufactured by Texas Instruments Inc.

Although an embodiment of the invention has been illustrated in the accompanyng drawing and described in the foregoing detailed description, it will be understood that the invention is not limited to the embodiment disclosed, but is capable of numerous rearrangements, modifications, and substitutions without departing from the scope of the invention.

I claim:

1. Apparatus for interconnecting a plurality of subscriber stations on a time division multiplex loop to establish a conference call wherein each subscriber station is assigned a separate time slot within a time frame for transmitting and receiving digitized speech samples, comprising:
   (a) means for generating a control signal comprising a preselected memory address generated synchronously with each time slot assigned to the respective subscriber stations in the conference call,
   (b) first memory means connected to receive said control signal and read out a first numerical quantity which is stored therein at said memory address upon receipt of said memory address, said first numerical quantity comprising a digitized sample of a speech signal,
   (c) second memory means connected to receive said control signal and read out a second numberical quantity which is stored therein at said memory address, said second numerical quantity comprising a digitized sample of a speech signal,
   (d) a buffer storage for storing each said numerical quantity read out of each of said memory means,
   (e) control means for alternately connecting on a frame by frame basis each of said memory means to said buffer storage for transferring to said buffer storage each numerical quantity read out from each of said memory means,
   (f) adding means connected to the multiplex loop and said buffer storage for adding each digitized speech sample generated by a conference subscriber station to the numerical quantity in said buffer storage to produce a summation numerical quantity after each digitized speech sample is generated by a conference subscriber station, said control means transferring the summation numerical quantity produced by said adding means to the memory means connected to said buffer storage for storage therein at said memory address, (g) delay means connected to the multiplex loop for receiving and delaying for approximately one frame period the digitized speech samples produced by the conference subscriber stations, (h) subtracting means connected by said control means to the one of said memory means not connected to said buffer storage, said subtracting means receiving the numerical quantity read out from the one of said memory means not connected to said buffer storage, said subtracting means connected to said delay means to receive said delayed digitized speech samples, said subtracting means subtracting each said delayed digitized speech sample from the numerical quantity received from said memory means to produce a conference digitized speech sample, said control means resetting the numerical quantity in said memory means connected to said subtracting means at the end of each frame, and (i) means for connecting the output of the subtracting means to the multiplex loop for transferring said conference digitized speech samples to each of the conference subscriber stations wherein each conference subscriber station receives a summation of all digitized speech samples produced during one frame by the conference subscriber stations minus the digitized speech sample generated by the receiving suscriber station.

2. Apparatus as recited in claim 1 wherein said means for generating comprises processor means for generating said memory address in response to a command from a subscriber station, circulating register means for storing said memory address and means for tapping said circulating register means to produce said control signal.

3. Apparatus as recited in claim 1 wherein said control means includes a first gate connecting the output of the adding means to one of said memory means, said first gate alternating the connection of the output of said adding means between said first and said second memory means on a frame by frame basis; a second gate connecting the output of said first memory means to either said subtracting means or said buffer storage, said second gate alternating the connection of the output of said first memory means between said subtracting means and said buffer storage on a frame by frame basis; and a third gate connecting the output of said second memory means to either said subtracting means or said buffer storage, said third gate alternating the connection of the output of said second memory means between said subtracting means and said buffer storage on a frame by frame basis.

4. Apparatus as recited in claim 1 further including an address generating circuit for generating a plurality of different memory addresses and combining said plurality of different memory addresses to produce said control signal; each of said memory addresses corresponding to a separate conference call and each memory address being generated synchronously with each of the time slots assigned to the subscriber stations in the corresponding conference call, said address generating circuit forming a part of said control signal generating means.

5. Apparatus for interconnecting a plurality of subscriber stations on a time division multiplex loop to establish a conference call wherein each subscriber station is assigned a separate time slot within a time frame for transmitting and receiving digitized speech samples, comprising:

(a) means for generating a control signal comprising a preselected memory address generated synchronously with each of the time slots assigned to the subscriber stations in the conference call, (b) a first random access memory connected to receive said control signal, (c) a second random access memory connected to receive said control signal, (d) adding means connected to the multiplex loop and connected alternately to said first random access memory and to said second random access memory on alternate time frames for accumulating in the one of said first and second random access memories connected to said adding means a summation speech sample at said memory address, said summation speech sample comprising the sum of the digitized speech samples generated during one time frame by the subscriber stations in the conference call, (e) subtracting means connected to the multiplex loop and connected alternately to said first random access memory and to said second random access memory on alternate time frames for generating difference digitized speech samples comprising the accumulated summation speech sample having sequentially subtracted therefrom the digitized speech samples utilized to produce the accumulated summation speech sample, and (f) means for conveying to each subscriber station in the conference call the difference digitized speech sample comprising the accumulated summation speech sample having the receiving subscriber station's digitized speech sample subtracted therefrom.

6. Apparatus as recited in claim 5 further including means for delaying the digitized speech samples generated by the subscriber stations in the conference call for a time period of approximately one time frame and supplying the delayed digitized speech samples to said subtracting means.

7. Apparatus as recited in claim 5 wherein said means for generating comprises:

(a) means for monitoring status words generated by the subscriber stations to request establishment of a conference call and generating said memory address in response thereto, and (b) circulating register means connected to said means for monitoring to receive said memory address therefrom and generate said control signal.

8. A method for interconnecting a plurality of subscriber stations on a time division multiplex loop to establish a conference call wherein each subscriber station is assigned a separate time slot within a time frame for transmitting and receiving digitized speech samples, comprising the steps of:

(a) generating a predetermined memory address during each time slot assigned to a subscriber station in the conference call and transferring said memory address to a first and a second memory means, (b) accumulating a summation sample of the digitized speech samples generated during one time frame by the subscriber stations in the conference call, said step of accumulating utilizing alternately by frame said first and second memory means, (c) storing said summation sample alternately by frame in one of said memory means at the end of each time frame, (d) generating a receive digitized speech sample for each subscriber station by subtracting the receiving subscriber station's digitized speech sample which was generated by the receiving subscriber station during the time frame over which said summation sample was accumulated, from said summation sample, and (e) conveying said receive digitized speech sample to the subscriber station that generated the digitized speech sample that was subtracted from said summation sample.

9. A method as recited in claim 8 further including the step of generating an additional predetermined memory address for each additional conference call.

* * * * *